(12) United States Patent
Maguin et al.

(10) Patent No.: US 9,732,742 B2
(45) Date of Patent: Aug. 15, 2017

(54) CONVEYING UNIT FOR A REDUCING AGENT

(71) Applicant: EMITEC GESELLSCHAFT FUER EMISSIONSTECHNOLOGIE MBH, Lohmar (DE)

(72) Inventors: Georges Maguin, Ars Laquenexy (FR); Loic Badoual, Malzeville (FR)

(73) Assignee: EMITEC Geselllschaft fuer Emissionstechnologie mbH, Lohmar (DE)

( * ) Notice: Subject to any disclaimer, the term of this patent is extended or adjusted under 35 U.S.C. 154(b) by 823 days.

(21) Appl. No.: 13/963,465

(22) Filed: Aug. 9, 2013

(65) Prior Publication Data

US 2013/0323083 A1 Dec. 5, 2013

Related U.S. Application Data

(63) Continuation of application No. PCT/EP2012/051809, filed on Feb. 2, 2012.

(30) Foreign Application Priority Data

Feb. 9, 2011 (DE) .......................... 10 2011 010 644

(51) Int. Cl.
| | |
|---|---|
| F04B 9/08 | (2006.01) |
| F04B 43/02 | (2006.01) |
| F01N 3/20 | (2006.01) |

(52) U.S. Cl.
CPC ............ F04B 43/02 (2013.01); F01N 3/2066 (2013.01); *F01N 2610/1453* (2013.01); *Y02T 10/24* (2013.01)

(58) Field of Classification Search
CPC ................... F04B 43/02; F01N 3/2006; F01N 2610/1453; Y02T 10/24
(Continued)

(56) References Cited

U.S. PATENT DOCUMENTS

| | | | | | |
|---|---|---|---|---|---|
| 2,413,851 | A | * | 1/1947 | Taylor | ..................... F04B 13/02 417/199.1 |
| 3,000,320 | A | * | 9/1961 | Ring | ....................... F04B 15/04 137/375 |

(Continued)

FOREIGN PATENT DOCUMENTS

| | | |
|---|---|---|
| DE | 19819408 A1 | 11/1999 |
| DE | 10108506 A1 | 8/2002 |

(Continued)

OTHER PUBLICATIONS

Pentair, Head Lossin Piping Systems, www.hydromatic.com/ ResidentialPage_techinfopage_headloss.aspx., Jun. 11, 2011.*

(Continued)

*Primary Examiner* — Charles Freay
(74) *Attorney, Agent, or Firm* — Laurence A. Greenberg; Werner H. Stemer; Ralph E. Locher

(57) ABSTRACT

A conveying unit for conveying reducing agent from a tank to an exhaust gas treatment device for treating the exhaust gases from an internal combustion engine, includes a pump having a drive or drive unit and a pump chamber unit or containment. The pump chamber unit or containment at least partly delimits a pump chamber and the drive or drive unit and the pump chamber unit or containment are detachable from one another.

5 Claims, 8 Drawing Sheets

(58) Field of Classification Search
USPC .......................................... 417/383, 385, 390
See application file for complete search history.

(56) References Cited

U.S. PATENT DOCUMENTS

| | | | | |
|---|---|---|---|---|
| 3,257,952 | A * | 6/1966 | McCormick | F04B 43/107 |
| | | | | 417/383 |
| 4,003,679 | A * | 1/1977 | McManigill | F04B 9/06 |
| | | | | 417/246 |
| 6,468,056 | B1 | 10/2002 | Murakoshi | |
| 7,481,628 | B2 | 1/2009 | Yamamoto et al. | |
| 7,686,595 | B1 * | 3/2010 | Graham | F04B 13/00 |
| | | | | 417/413.1 |
| 8,359,831 | B2 | 1/2013 | Chmielewski et al. | |
| 8,464,966 | B2 | 6/2013 | Haeberer et al. | |
| 8,534,326 | B2 | 9/2013 | Jochumsen et al. | |
| 8,881,754 | B2 | 11/2014 | Boe et al. | |
| 2001/0038796 | A1 * | 11/2001 | Schluecker | F04B 43/0063 |
| | | | | 417/383 |
| 2004/0179960 | A1 * | 9/2004 | Lenke | F01N 3/2066 |
| | | | | 417/415 |
| 2005/0069468 | A1 * | 3/2005 | Huber | F01N 3/2066 |
| | | | | 422/172 |
| 2006/0048503 | A1 | 3/2006 | Havers | |
| 2007/0020123 | A1 | 1/2007 | Meyer et al. | |
| 2007/0199308 | A1 * | 8/2007 | Satou | B01D 53/9431 |
| | | | | 60/286 |
| 2007/0251226 | A1 | 11/2007 | Kaneko | |
| 2009/0127265 | A1 | 5/2009 | Magnusson et al. | |
| 2011/0147485 | A1 | 6/2011 | Perruchot et al. | |

FOREIGN PATENT DOCUMENTS

| | | |
|---|---|---|
| DE | 102004011123 A1 | 3/2005 |
| DE | 102006044246 A1 | 3/2008 |
| DE | 10 2010 063 731 A1 | 9/2011 |
| EP | 2 182 190 A2 | 5/2010 |
| JP | H0626464 A | 2/1994 |
| JP | 4137838 B2 | 8/2008 |
| JP | 2009520581 A | 5/2009 |
| JP | 2009535253 A | 10/2009 |
| JP | 2010514973 A | 5/2010 |
| JP | 2010180801 A | 8/2010 |
| KR | 100679782 B1 | 2/2007 |
| KR | 100717626 B1 | 5/2007 |
| RU | 2372521 C2 | 11/2009 |
| WO | 2004073840 A1 | 9/2004 |

OTHER PUBLICATIONS

WayBackMachine printout showing date of Pentair reference, Dec. 15, 2016.*
International Search Report of PCT/EP2012/051809, Dated May 21, 2012.

* cited by examiner

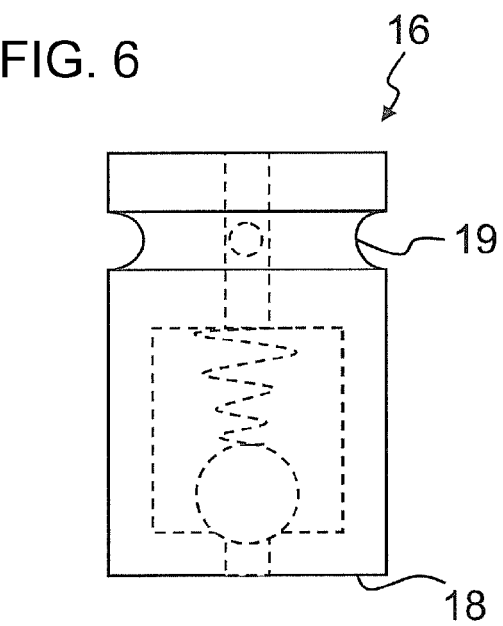
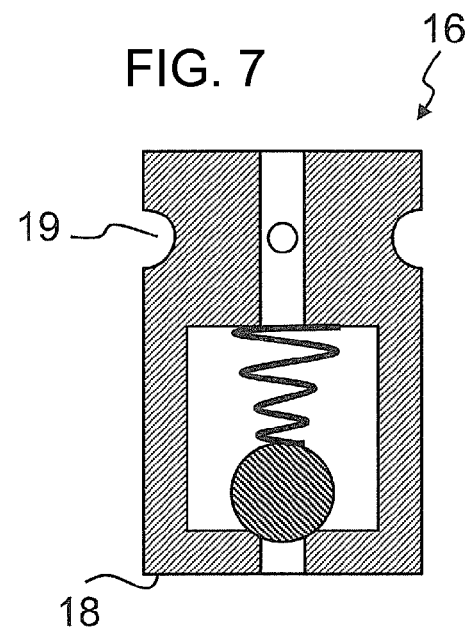
FIG. 6
FIG. 7
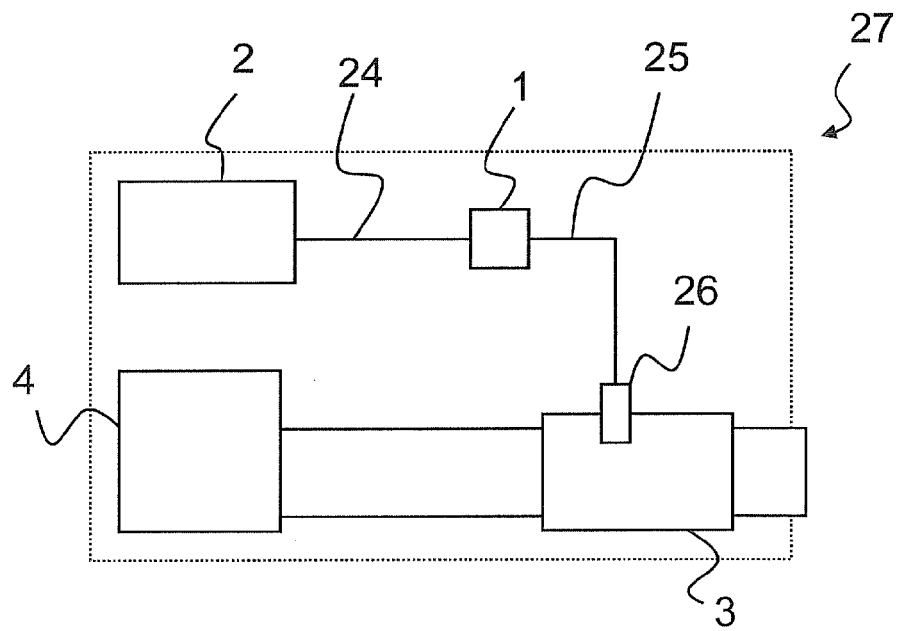
FIG. 8

CONVEYING UNIT FOR A REDUCING AGENT

CROSS-REFERENCE TO RELATED APPLICATION

This is a continuation application, under 35 U.S.C. §120, of copending International Application No. PCT/EP2012/051809, filed Feb. 2, 2012, which designated the United States; this application also claims the priority, under 35 U.S.C. §119, of German Patent Application DE 10 2011 010 644.8, filed Feb. 9, 2011; the prior applications are herewith incorporated by reference in their entirety.

BACKGROUND OF THE INVENTION

Field of the Invention

The invention relates to a conveying unit for conveying reducing agent from a tank to an exhaust gas treatment device for treating the exhaust gases from an internal combustion engine.

Exhaust gas treatment processes in which a reducing agent is fed to the exhaust gas to reduce pollutants in the exhaust gas have been used increasingly in recent years, in particular in the automotive industry. One such exhaust gas cleaning process is the process of selective catalytic reduction (SCR process). With that process, nitrogen oxide compounds in the exhaust gas, in particular, are reduced by using a reducing agent. Ammonia is often used as a reducing agent. In particular in motor vehicles, ammonia is supplied not directly but in the form of a reducing agent precursor or in the form of a reducing precursor solution. Urea-water solution is an example of such a reducing agent precursor solution. Urea-water solution can be converted to ammonia in the exhaust gas. A 32.5% urea-water solution is available under the trademark AdBlue®. The term "reducing agent" will be used hereinafter for the reducing agent itself and also for the reducing agent precursor solution.

A device for preparing urea-water solution faces the problem that urea-water solution freezes at temperatures of −11° C. The term "freezes" as used herein is taken to mean the phase transition from solid to liquid. Temperatures of that type generally occur during the operation of internal combustion engines, in particular in the automotive industry, for example during prolonged idle periods in winter. A conveying unit for conveying reducing agent from a tank to an exhaust gas treatment device must therefore be constructed in such a way that it is not damaged by the freezing of reducing agent. In addition, it is necessary for the conveying unit to quickly be operative again if there is frozen reducing agent in the conveying unit. At the same time, the conveying unit should have maximum metering precision. It can thus be ensured that precisely the amount of reducing agent required for exhaust gas cleaning is fed to the exhaust gas treatment device in each case. Minimum reducing agent consumption can thus be achieved.

BRIEF SUMMARY OF THE INVENTION

It is accordingly an object of the invention to provide a conveying unit for a reducing agent, which overcomes the hereinafore-mentioned disadvantages and solves or at least mitigates the above-mentioned technical problems of the heretofore-known units of this general type. In particular, an especially cost-effective, freeze-proof, precisely metering conveying unit for reducing agents is to be disclosed.

With the foregoing and other objects in view there is provided, in accordance with the invention, a conveying unit for conveying reducing agent from a tank to an exhaust gas treatment device for treating the exhaust gases from an internal combustion engine. The conveying unit comprises a pump having a drive or drive unit and a pump chamber unit or containment. The pump chamber unit or containment at least partly delimits a pump chamber and the drive or drive unit and the pump chamber unit or containment are detachably connected to one another.

The pump chamber is a compartment in the pump in which the driving power of the drive unit is converted into a movement of the reducing agent. This transfer of energy may be brought about, for example, by changing the volume or the shape of the pump chamber or by a mechanical transfer device. A mechanical transfer device may, for example, be an impeller. However, transfer by using a change in the volume of the pump chamber is preferred in this case. This transfer mechanism is produced, for example, in piston pumps and diaphragm pumps.

In the past, reducing agents were conventionally conveyed in conveying units using respective ready-made pumps, which were available as ready-made components from a pump manufacturer and used as a type of "black box." Pumps of that type have the advantage that they are cost-effective and reliable. They typically have a feed line and a return line which can each be connected to corresponding fittings on the conveying unit. Pumps of that type can therefore only be replaced as a whole. The present invention departs from that approach by proposing that the pump chamber of a pump be disposed at least in part in a pump chamber unit. According to the present invention, a drive unit which may be fixed to the pump chamber unit exists separately from the pump chamber unit. The drive unit and the pump chamber unit may be replaced separately from one another. This subdivision makes the construction of the overall pump more complex than the construction of the above-described formerly conventional pumps. On the other hand, the drive disposed in the drive unit and the pump chamber disposed in the pump chamber unit can each be adapted separately to the respective requirements of reducing agent conveyance. The configuration according to the invention also enables separate replacement of the drive unit and the pump chamber unit if the drive unit or the pump chamber unit is damaged. The expression "the pump chamber unit or containment at least partly delimits a pump chamber" is taken to mean, in particular, that the pump chamber unit forms at least a part of the pump chamber wall. The pump chamber may additionally be limited by a diaphragm which then also forms a part of the pump chamber wall.

In accordance with another particularly advantageous feature of the conveying unit of the invention, the conveying unit includes a flange to which the drive unit is fastened and the pump chamber unit is formed at least in part by the flange.

The term "flange" in this context is taken to mean, in particular, a common carrier structure on which all components of the conveying unit are mounted. The expression "components" is taken to mean, for example, the above-described pump drive unit, various valves, various sensors and/or compensating members for compensating the increase in volume of the reducing agent when it freezes. A filter for filtering the reducing agent may also be a component of the conveying unit. The flange may be constructed, for example, as a metallic structure. The preferred material for the flange is aluminum because aluminum has high thermal conductivity on one hand and is very light on the other hand. The flange is preferably configured in the form of a plate, with the individual described components being mounted on one or both sides of the flange. The material of the flange is preferably a good conductor of heat so that heat introduced into the conveying unit by a heating system is well distributed in the individual components of the conveying unit.

The pump chamber unit is preferably a constituent of the flange. The pump chamber may be constructed, for example, as a cavity, recess or indentation in the flange. The drive unit is preferably mounted on the flange in such a way that the drive of the conveying unit acts on the pump chamber unit. The pump is preferably a reciprocating pump, for example a piston pump, a diaphragm pump or a piston/diaphragm pump. The drive unit preferably has a rotary drive which performs a rotational movement which is then converted by a transfer element into a reciprocating or linear movement of a movable pump element. This movement has a regularly alternating direction of movement and an upper return point and a lower return point. The transfer element may be constructed, for example, in the form of an eccentric member and a connecting rod or in the form of a camshaft or a cam disc. Alternatively, however, it is also possible for the drive unit to include a linear drive which directly performs a linear movement. This may, for example, be an electric linear drive. If the drive unit includes a linear drive, it is not necessary to provide a transfer element for converting the movement of the drive into a linear movement of the movable pump element. The linear movement of the movable pump element is used uniformly to increase or decrease the volume of the pump chamber.

In accordance with a further particularly advantageous feature of the conveying unit of the invention, the pump chamber unit and the drive unit are separated by a pump diaphragm. A movable drive unit pump element can then act directly on the pump diaphragm which then uniformly increases and decreases the volume of the pump chamber unit so that the pump conveys reducing agent. However, the pump diaphragm can also itself be considered as a constituent of the movable pump element.

In accordance with an added particularly advantageous feature of the conveying unit of the invention, the pump chamber unit is constructed in the form of a half shell and the pump chamber is limited by the pump chamber unit and by the pump membrane. The pump chamber may be constructed, for example, as a recess in a flange of the conveying unit. This recess can be covered by the pump diaphragm. The drive unit can then be positioned on the flange so that it covers the pump diaphragm and a movable pump element of the drive unit can move the pump diaphragm.

In accordance with an additional advantageous feature of the conveying unit of the invention, the pump chamber unit includes a principal compartment and a spur duct branching from the principal compartment, and at least one inlet valve and at least one outlet valve adjoin the spur duct.

This approach can also be adopted independently of the remaining features of the invention described herein. In particular, a conveying unit for conveying reducing agent from a tank to an exhaust gas treatment device for treating the exhaust gases from an internal combustion engine is proposed, comprising a pump having a pump chamber which includes a principal compartment and a spur duct branching from the principal compartment, and at least one inlet valve and at least one outlet valve adjoining the spur duct. A conveying unit of this type may optionally be combined with any other features described herein, without the need to include the drive unit and the pump chamber unit.

Reducing agent can pass from an intake side of the pump through the inlet valve into the pump chamber. Reducing agent can pass from the pump chamber through the outlet valve to an outlet side of the pump. The inlet valve and the outlet valve together determine the conveying direction of the pump.

The term "spur duct" also covers, in particular, a spur duct system formed of a plurality of individual ducts branching from a principal compartment of the pump chamber. Within the meaning of the present invention, a spur duct is in particular present, when during admission of the reducing agent into the pump chamber or into the principal compartment of the pump chamber through the inlet valve and the spur duct or the spur duct system and during discharge of the reducing agent from the pump chamber or from the principal compartment of the pump chamber through the spur duct or the spur duct system and the outlet valve, the reducing agent at least in part travels the same path through the spur duct. The direction of flow of the reducing agent in the spur duct or in the spur duct system therefore has to be reversed, at least in some regions, during the changeover from intake through the inlet valve to discharge through the outlet valve. A spur duct system which is understood as a spur duct within the meaning of the present invention is distinguished, in particular, in that there is a connection, through which reducing agent can pass, between the individual ducts of the spur duct system, with the connection being disposed closer to the inlet valve and the outlet valve than the principal compartment of the pump chamber. In regard to the configuration of the spur duct it is preferred that the spur duct be aligned substantially in a horizontal manner, i.e. the spur duct is disposed above the pump chamber. Thereby, air bubbles might be removed easily, if air bubbles were formed within the pump chamber.

A particularly small pump chamber dead volume can be achieved as a result of the described configuration of the pump chamber with a principal compartment and a spur duct. The dead volume is the smallest volume which emerges as a result of the deflection of the pump diaphragm. The movable pump element is typically located at a lower return point when the dead volume is located in the pump chamber. In the case of a diaphragm pump or a piston pump, the dead volume exists in the pump chamber when the diaphragm or the piston are located at their lower return point.

In accordance with yet another particularly advantageous feature of the conveying unit of the invention, the extent of the spur duct from the principal compartment to the inlet valve and to the outlet valve has a length of between 1 mm (millimeter) and 20 mm.

In accordance with yet a further advantageous feature of the conveying unit of the invention, the spur duct has a cross-sectional area of between 0.1 mm$^2$ [square millimeters] and 4 mm$^2$ per liter of the maximum capacity of the pump per hour, in particular between 0.1 mm$^2$ and 2 mm$^2$.

The resistance to flow of the reducing agent as it enters the pump chamber and is discharged from the pump chamber basically depends on the length of the spur duct from the principal compartment to the inlet valve and to the outlet valve and on the cross-sectional area of the spur duct. Therefore, it is particularly advantageous if the length and the cross-sectional area are dimensioned according to the capacity of the conveying pump. At the same time, a greater length of the spur duct allows particularly flexible positioning of the inlet valve and the outlet valve of the pump. This in turn simplifies construction, assembly and maintenance of the conveying unit according to the invention.

In accordance with yet an added advantageous feature of the conveying unit of the invention, the pump chamber has a chamber volume which can be reduced during a pumping procedure to a dead volume, and the dead volume is less than 20%, preferably less than 10% and particularly preferably less than 5% of the chamber volume. A large difference of this type between the dead volume and the chamber volume may be achieved, in particular, by the configuration of the pump chamber with a principal compartment and a branching spur duct according to the invention.

In accordance with yet an additional advantageous feature of the conveying unit of the invention, the pump has a rotary drive, a movable pump element and a transfer element for converting a rotational movement of the rotary drive into a linear movement of the movable pump element, and at least one smoothing device is provided for smoothing the movement of the movable pump element.

This approach can also be adopted independently of the remaining features of the conveying unit according to the invention. In particular, a conveying unit for conveying reducing agent from a tank to an exhaust gas treatment device for treating the exhaust gases from an internal combustion engine is provided, comprising a pump including a rotary drive, a movable pump element and a transfer element for converting a rotational movement of the rotary drive into a linear movement of the movable pump element, and at least one smoothing device for smoothing the movement of the movable pump element. A conveying unit of this type may optionally be combined with any other features described herein, without the need to include the drive unit and the pump chamber unit having the pump chamber.

Typical transfer elements for converting a rotational movement into a linear movement produce a linear movement having at least a sinusoidal component. If a connecting rod converts a uniform rotational movement into a linear movement, the linear movement has respective upper and lower return points. The linear movement has the highest speed exactly in the center between the two return points in each case. The speed decreases and increases sinusoidally toward the respective return points, and the direction of movement changes at the return points.

A movement of this type which is at least in part sinusoidal has a drawback for a metering pump. The speed of movement of the movable pump element determines the delivery rate of the conveying pump. Due to the sinusoidal movement, therefore, the delivery rate is not uniform but varies. That is undesirable, in particular for a metering pump which is to have a uniform output. In order to overcome this problem, it is proposed to provide at least one smoothing device which smoothes and, in particular, linearizes the movement of the movable element. In a first variant, the smoothing device can be produced mechanically in the movable pump element. For example, a special eccentric member in the form of a cam disc can be used, which is so shaped that the movement of the movable pump element is linear at least in some regions. It is also possible to provide a specific connecting rod or a specific connecting rod system which linearizes the conversion of the rotational movement into a linear movement. A connecting rod system can be formed of a plurality of interconnected connecting rods.

In a second variant, a smoothing device can be produced in the form of a rotary drive controller. It is possible, for example, for the rotary drive to drive the transfer element at variable speed and for the irregular transfer of the movement by the transfer element to thus be compensated at least in part. Complete linearization of the movement of the movable pump element is not possible, in particular in the region of the return points of the movable pump element. The direction of movement of the movable pump element is reversed at the return points. For this purpose, the movable pump element has to be initially decelerated and then accelerated. A deviation from an exactly linearized movement is required to respectively decelerate and accelerate the movable pump element. In this case, sensing devices for monitoring the motion of the pump element can be provided, i.e. a magnetic sensor, an optical sensor or a pressure sensor, which detects pressure fluctuations (indirectly) in the conveyed reducing agent due to an insufficient linearized movement.

In accordance with a concomitant advantageous feature of the conveying unit of the invention, a control device is configured or programmed to operate the pump for a test run with minimal driving power in order to determine whether or not frozen reducing agent in the conveying unit is impeding operation of the pump.

This approach can also be adopted independently of the further features of the conveying unit according to the invention. In particular, a conveying unit for conveying reducing agent from a tank to an exhaust gas treatment device for treating the exhaust gases from an internal combustion engine, comprises a pump, and a control device or controller configured or programmed to operate the pump for a test run with minimal driving power in order to determine if frozen reducing agent in the conveying unit is impeding operation of the pump. A conveying unit of this type may optionally be combined with any other features described herein, without the need to include the drive unit and the pump chamber unit having the pump chamber.

The invention also relates to a process for operating a conveying unit including a pump for conveying reducing agent from a tank to an exhaust gas treatment device for treating the exhaust gases from an internal combustion engine. The process comprises the following steps:
  a) activation of a pump drive with minimal driving power,
  b) checking whether or not the movable pump element is moving,
  c) deactivating the drive if the movable pump element is not moving, and
  d) increasing the driving power if a movement of the movable pump element has been established in step b).

It is also possible to establish indirectly whether or not the movable pump element is moving, by checking whether or not the rotary drive is moving. This is possible, in particular, if the rotary drive and the movable pump element are coupled to one another through the transfer element. Damage to the pump can be prevented by initially checking at a low driving power whether or not free movement of the movable pump element is possible. The pump can easily be damaged if it develops its full driving power while the movement of the movable pump element or the drive is impeded by frozen reducing agent, for example in the pump chamber.

Other features which are considered as characteristic for the invention are set forth in the appended claims, noting that the features recited individually in the claims may be combined with one another in any technologically feasible manner and may be supplemented by explanatory facts from the description, with further variants of the invention being illustrated.

Although the invention is illustrated and described herein as embodied in a conveying unit for a reducing agent, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 6 is an elevational view of a valve for a pump for a conveying unit according to the invention;

FIG. 7 is a sectional view of the valve according to FIG. 6;

FIG. 8 is a block diagram of a motor vehicle having a conveying unit according to the invention;

DESCRIPTION OF THE INVENTION

Figure 1:
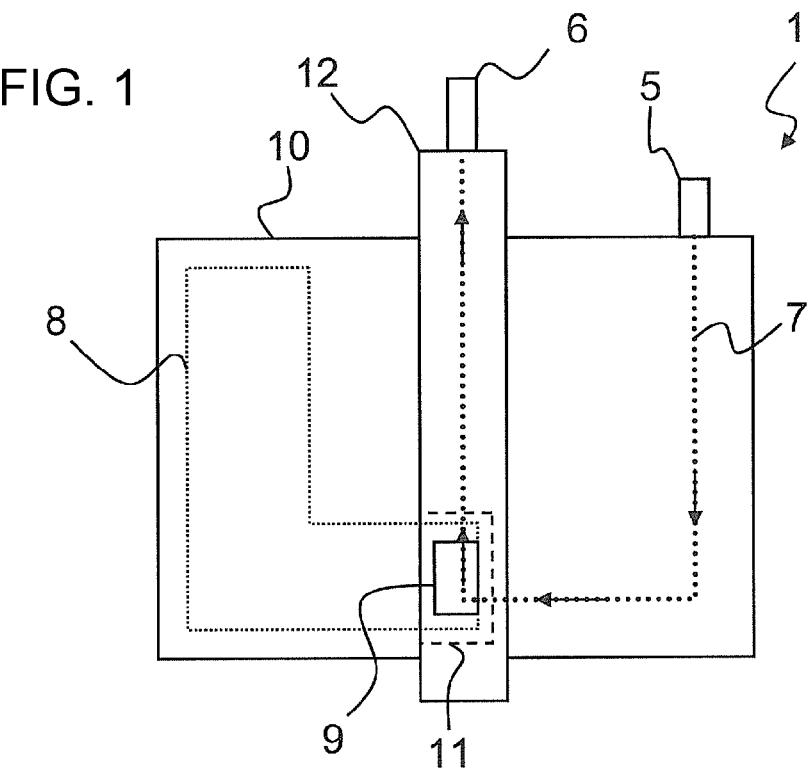
FIG. 1 is a diagrammatic, vertical-sectional view of a variant of a conveying unit according to the invention.

Referring now in detail to the figures of the drawings, which show particularly preferred embodiments to which the invention is not limited and in which dimensions are merely diagrammatically illustrated and first, particularly, to FIG. 1 thereof, there is seen a conveying unit 1 having a flange 12. Various components of the conveying unit 1 are mounted on the flange 12. According to FIG. 1, for example, a drive or drive unit 10 for a pump 8 is fixed on the flange 12. In addition to the drive unit 10, the pump 8 includes a pump chamber unit or containment 11. The pump chamber unit 11 is a constituent of the flange 12. A pump chamber 9 is located in the pump chamber unit or containment 11. A conveyance path 7 through the conveying unit 1 extends from an inlet fitting 5 through the pump chamber 9 in the pump chamber unit 11 to an outlet fitting 6.

Figure 2:
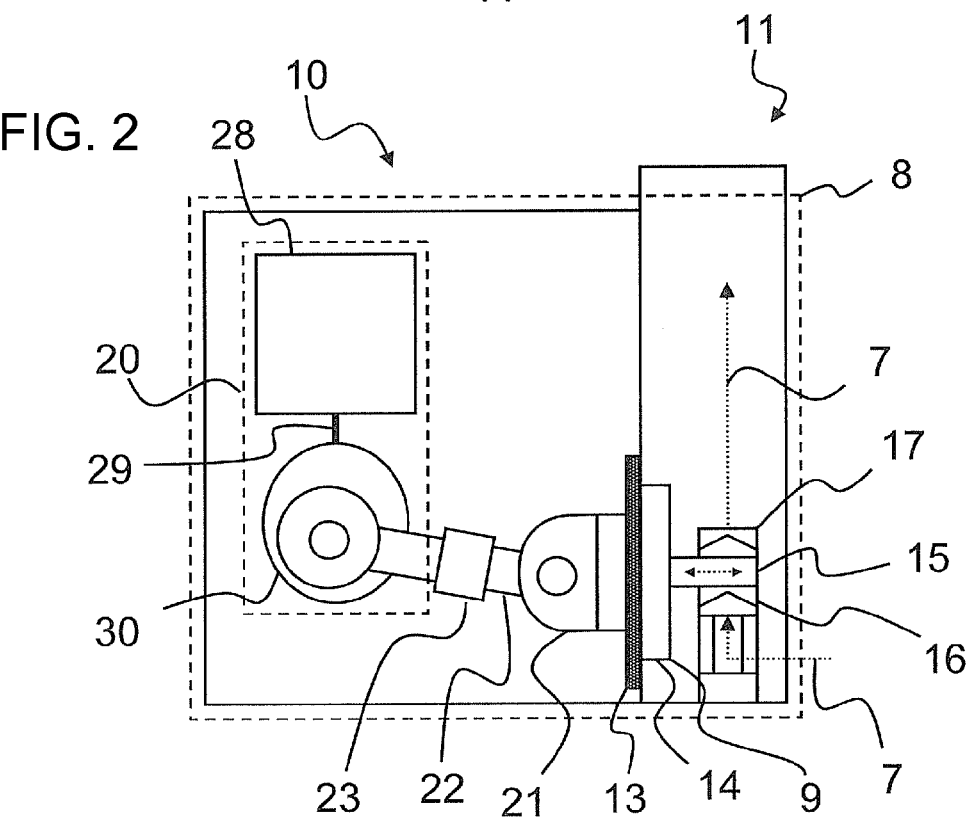
FIG. 2 is a vertical-sectional view of a first variant of a pump of a conveying unit according to the invention.

FIG. 2 is a detailed view of a first variant of the pump 8 showing the drive unit 10 and the pump chamber unit or containment 11. The drive or drive unit 10 includes a motor 28 which drives an eccentric member 30 through a gear 29. The motor 28, the gear 29 and the eccentric member 30 together form a rotary drive 20. A movement of the eccentric member 30 is transferred through a transfer element or converter 22 to a movable pump element 21. In the transfer element 22 there can optionally be provided a smoothing device 23 through which a conversion of a rotational movement of the rotary drive 20 into a linear movement of the movable pump element 21 can be smoothed. The pump chamber 9 can initially be seen in the pump chamber unit 11. The pump chamber 9 is formed of a principal compartment 14 and a spur duct 15. An arrow in the spur duct 15 indicates how the reducing agent flows into the pump chamber 9 during intake and flows out of the pump chamber 9 during discharge, alternately in different respective directions in the spur duct 15. An inlet valve 16 and an outlet valve 17 adjoin the spur duct 15. The inlet valve 16 and the outlet valve 17 are preferably identical in construction. The path 7 for the conveyance of reducing agent through the pump 8 extends from the inlet valve 16 through the spur duct 15 into the principal compartment 14 of the pump chamber 9 and back through the spur duct 15 and the outlet valve 17. The inlet valve 16 and the outlet valve 17 are inserted into a corresponding passage in the pump chamber unit 11.

Figure 3:
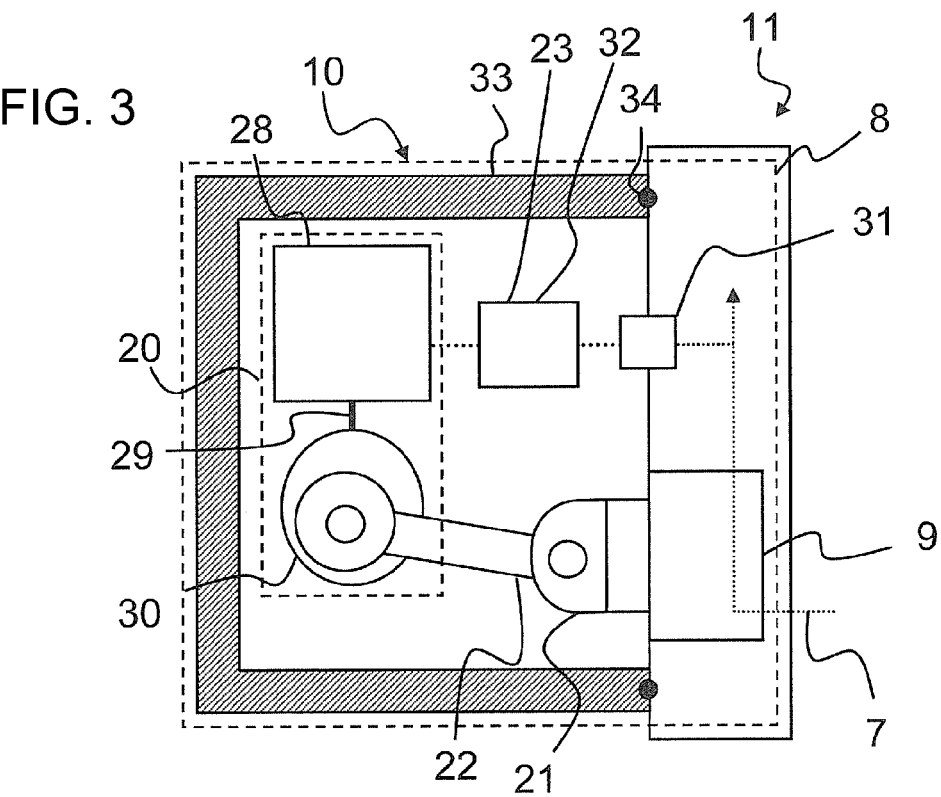
FIG. 3 is a vertical-sectional view of a second variant of a pump of a conveying unit according to the invention.

In a second variant of the pump 8 shown in FIG. 3, the illustration focuses on aspects which are different from FIG. 2. In this case, the pump chamber 9 is merely shown diagrammatically. A smoothing device 23 disposed on the transfer element 22 for smoothing the transfer of the rotational movement of the rotary drive 20 into the linear movement of the movable pump element 21, is not illustrated either. Instead, a pressure sensor 31 is illustrated which adjoins the conveyance path 7 through the pump 8. The pressure in the conveyance path downstream of the pump 8 can be established by this pressure sensor 31. The pressure measured by the pressure sensor 31 can be evaluated in a controller 32 so that the rotary drive 20 of the pump 8 is controlled so as to cause the rotational movement of the rotary drive 20 to take place in such a way that the linear movement of the movable pump element 21 is linear at least in some regions or in part. The controller 32 may be configured or programmed to operate the pump 8 for a test run with minimal driving power in order to determine if frozen reducing agent in the conveying unit 1 is impeding operation of the pump 8. FIG. 3 also shows that the drive unit 10 includes a housing 33 which is open on one side and sealed on the pump chamber unit 11 by a seal 34. The pump chamber unit 11 can be a constituent of a flange of the conveying unit 1 according to the invention. The housing 33, which is open on one side, can thus cover further components such as the pressure sensor 31, the controller 32 or also a temperature sensor (which is not shown herein) in addition to the rotary drive 20 of the pump 8. These components need not be direct constituents of the pump 8. The pump 8 and further components of the conveying unit 1 according to the invention can thus be integrated with one another.

Figure 4:
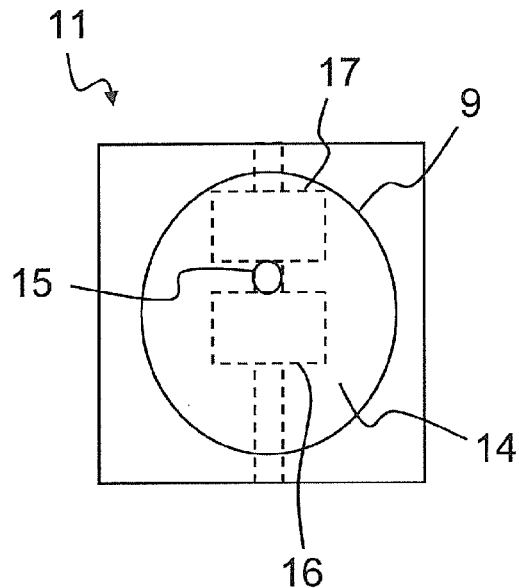
FIG. 4 is an elevational view of a pump chamber unit for a pump of a conveying unit according to the invention.

FIG. 4 is a view of a pump chamber unit or containment 11 for a pump 8 of a conveying unit 1 according to the invention, showing the principal compartment 14 of the pump chamber 9. The spur duct 15 branches from the principal compartment 14. The inlet valve 16 and the outlet valve 17 adjoining the spur duct 15 are shown in broken lines below the principal compartment 14.

Figure 5:
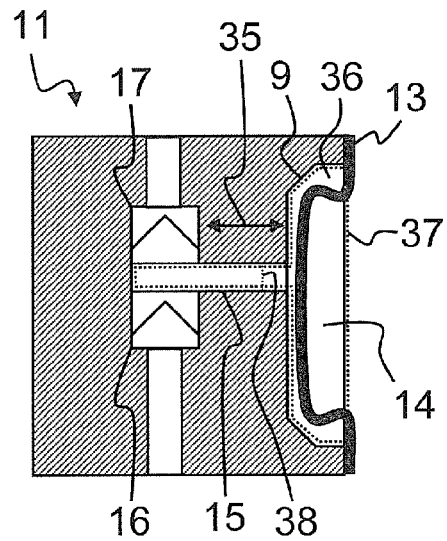
FIG. 5 is a sectional view of the pump chamber unit according to FIG. 4.

The principal compartment 14 and the spur duct 15 forming the pump chamber 9 are shown in section in FIG. 5. The manner in which the inlet valve 16 and the outlet valve 17 adjoin the spur duct 15 is also shown. A pump diaphragm 13 which limits the pump chamber 9 is additionally shown. A chamber volume 37 which exists when a movable pump element 21 is at a upper return point is shown in broken lines. The chamber volume 37 corresponds to a maximum volume occurring in the pump chamber 9 during conveyance. A dead volume 36, which corresponds to a minimum volume of the pump chamber 9 during conveyance, is also indicated. This dead volume 36 exists in the pump chamber 9 when the movable pump element 21 is located at its lower return point. FIG. 5 also shows a length 35 of the spur duct 15 from the principal compartment 14 of the pump chamber 9 to the inlet valve 16 and to the outlet valve 17. A cross-section 38 of the spur duct 15 is further indicated in broken lines.

FIG. 6 shows an inlet valve 16 which may be used in a particularly advantageous manner in the conveying unit 1 according to the invention.

A valve corresponding to the illustrated inlet valve 16 can also be used as an outlet valve 17. The inlet valve 16 includes a base body 18 which is rotationally symmetrical. The valve ducts and mechanism are indicated in broken lines in the base body 18. The base body 18 has a circumferential connecting duct 19 which communicates with internal ducts in the inlet valve 16. An inlet valve 16 of this type may be positioned as desired in a passage in a pump chamber unit 11 of a conveying unit 1 according to the invention and, through the use of the circumferential duct, can produce a connection to a channel which opens laterally into the passage.

In order to clarify the illustration in FIG. 6, FIG. 7 shows a further section through the inlet valve 16 in FIG. 6.

FIG. 8 shows a motor vehicle 27 including an internal combustion engine 4 and an exhaust gas treatment device 3 for cleaning exhaust gases from the internal combustion engine 4. The motor vehicle 27 includes a tank 2 for storing reducing agent. The reducing agent can be conveyed from the tank 2 through an intake pipe 24 to a conveying unit 1. The conveying unit 1 then conveys the reducing agent through an outlet pipe 25 to an injector 26 which feeds the reducing agent to the exhaust gas treatment device 3.

Figure 9:
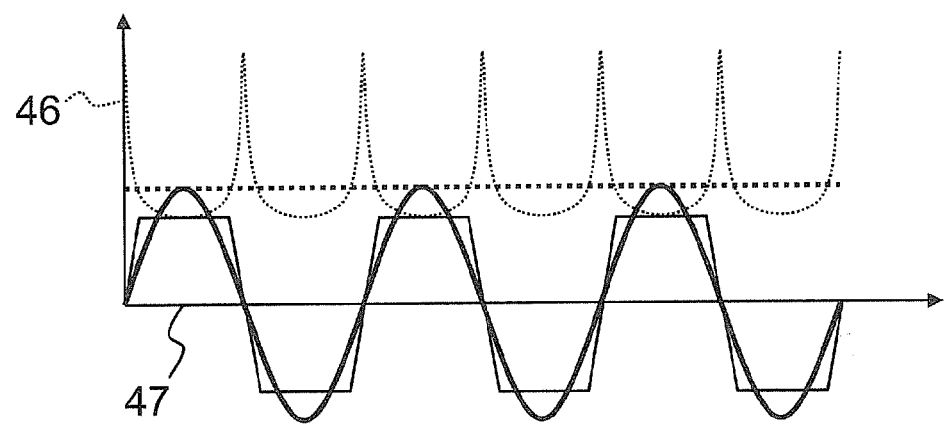
FIG. 9 is a graph illustrating speeds of a rotary drive and of a movable pump element.

FIG. 9 shows a graph of speeds of a rotary drive 20 and a movable pump element 21. The speed of movement of the rotary drive 20 is illustrated by a dotted line whereas the speed of the movable pump element is illustrated by a continuous line. The two bold lines belong together as do the two faint lines. The movement of the rotary drive 20 is transferred to the movable pump element 21 in this case by using a respective transfer element 22 which does not have a smoothing device 23. The speeds are plotted on a speed axis 46 with respect to time axis 47 in each case. According to the bold dotted line, the rotary drive 20 is operated at a constant speed. This produces the sinusoidal speed of movement of the movable pump element 21 corresponding to the bold continuous line. According to the faint dotted line, the rotary drive 20 is operated at a regularly varying speed. The rotary drive 20 is driven faster in some regions in order to linearize the movement of the movable pump element 21 at least in some regions, as can be inferred from the faint continuous line showing the speed of the movable pump element 21 produced when the rotary drive is driven in accordance with the faint dotted curve. However, complete linearization is not possible, in particular in the region of the reversals of the direction of movement of the movable pump element 21 at the upper return point and at the lower return point. In order for that to occur, it would in fact be necessary for the rotary drive 20 to be operated at extremely high speeds.

Figure 10:
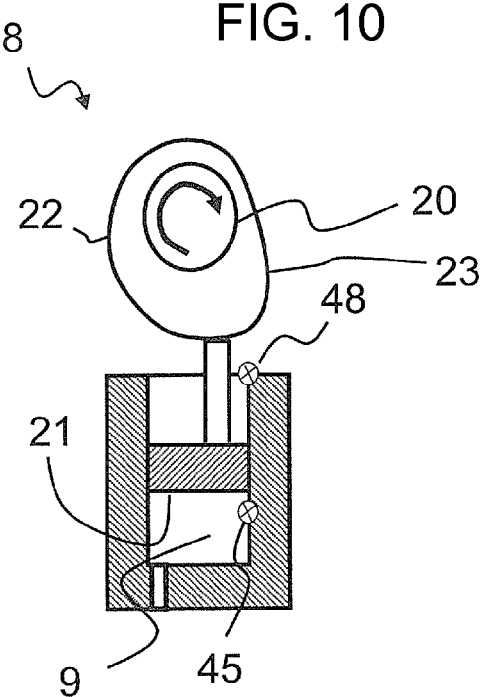
FIG. 10 is a sectional view of a pump for a conveying unit according to the invention.

FIG. 10 shows an example of a smoothing device 23 on the transfer element 22, illustrating a pump 8 for a conveying unit 1 according to the invention with a rotary drive 20. The movement of the rotary drive 20 is transferred to the movable pump element 21 through the transfer element 22. The transfer element 22 is constructed as a camshaft or as a cam disc. The smoothing device 23 is produced by configuring the pitch or circumferential contour or course of the camshaft or of the cam disc in such a way that the movement of the movable pump element 21 is uniform, at least in some regions, during uniform movement of the rotary drive 20. The movable pump element 21 is moved back and forth between an upper return point 48 and a lower return point 45. The pump chamber 9, the volume of which is increased and decreased by the movement of the movable pump element 21, is merely diagrammatically indicated.

Figure 11:
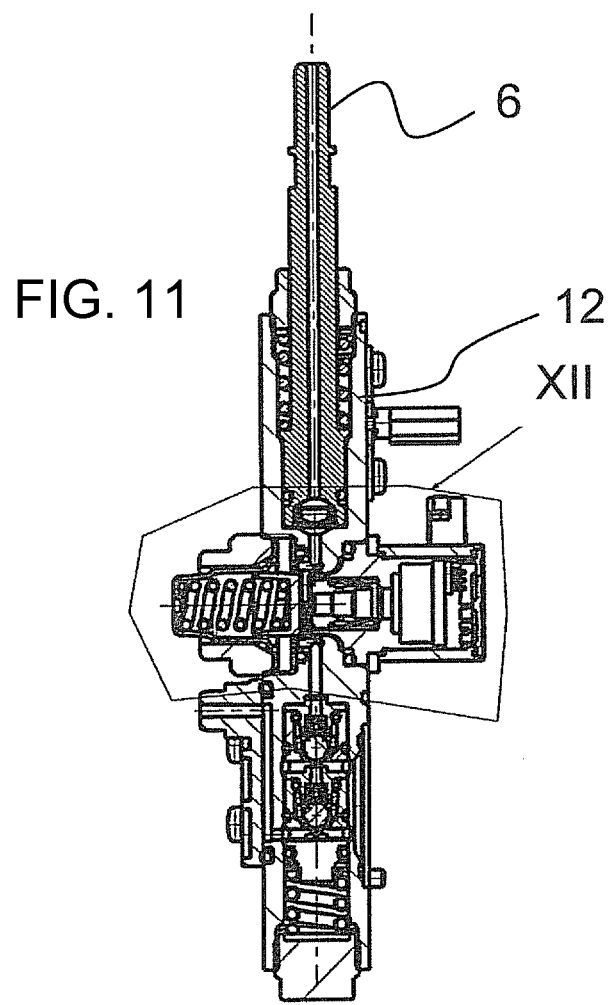
FIG. 11 is a longitudinal-sectional view of a flange of a conveying unit according to the invention.

FIG. 11 shows a flange 12 for a conveying unit 1 with a few accessories. For example, the outlet fitting 6 can be seen.

Figure 12:
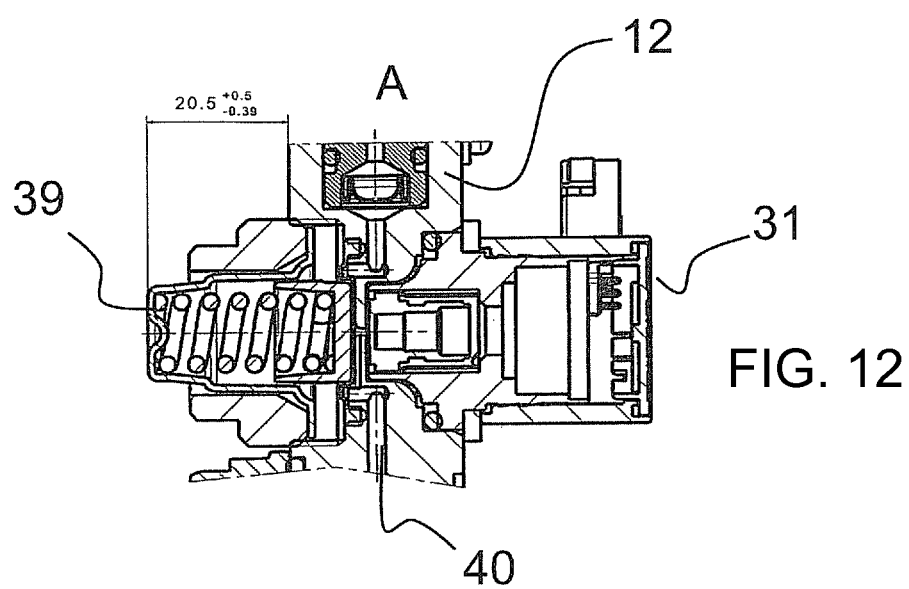
FIG. 12 is an enlarged, fragmentary, sectional view of a portion XII of FIG. 11.

FIG. 12 shows an enlarged portion of FIG. 11 which is designated by reference numeral XII in FIG. 11. A duct 40 can be seen, through which the conveyance path of the conveying unit 1 extends. A pressure sensor 31 is disposed on the duct 40 and a biased ice pressure compensation device 39 is mounted on the flange 12.

Figure 13:
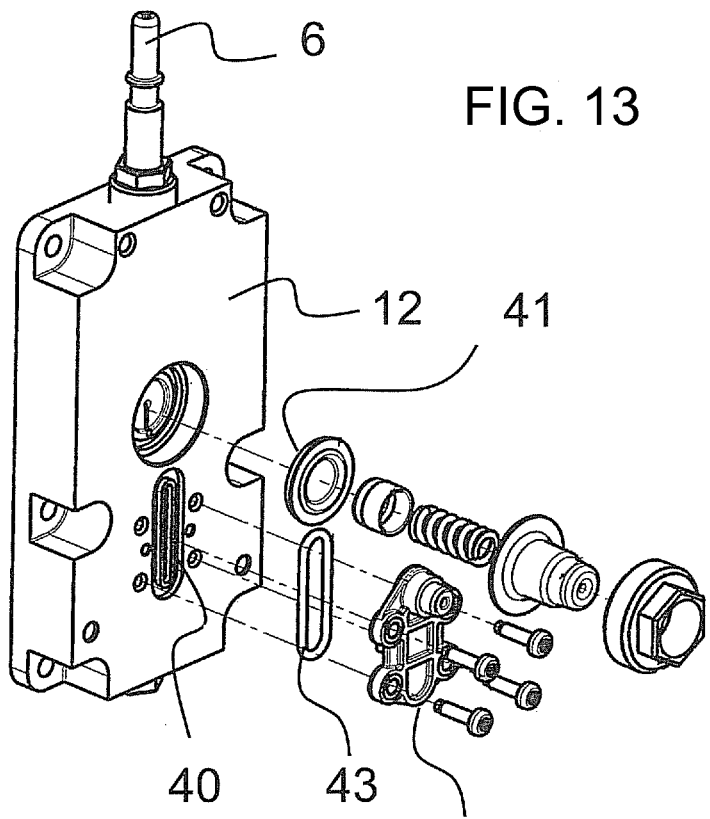
FIG. 13 is a first enlarged, exploded, perspective view of FIG. 11.

FIG. 13 is an exploded view of the flange 12 according to FIG. 11. It can be seen how the biased ice pressure compensation device 39 is mounted on the flange 12 through a first diaphragm 41. The outlet fitting 6 is also shown in FIG. 13 for orientation purposes. It can also be seen from FIG. 13 that the duct 40 in the flange 12 may also be located on the surface of the flange 12. The duct 40 is then closable by an accessory 42 which is sealed against the flange 12 by an O-ring seal 43.

Figure 14:
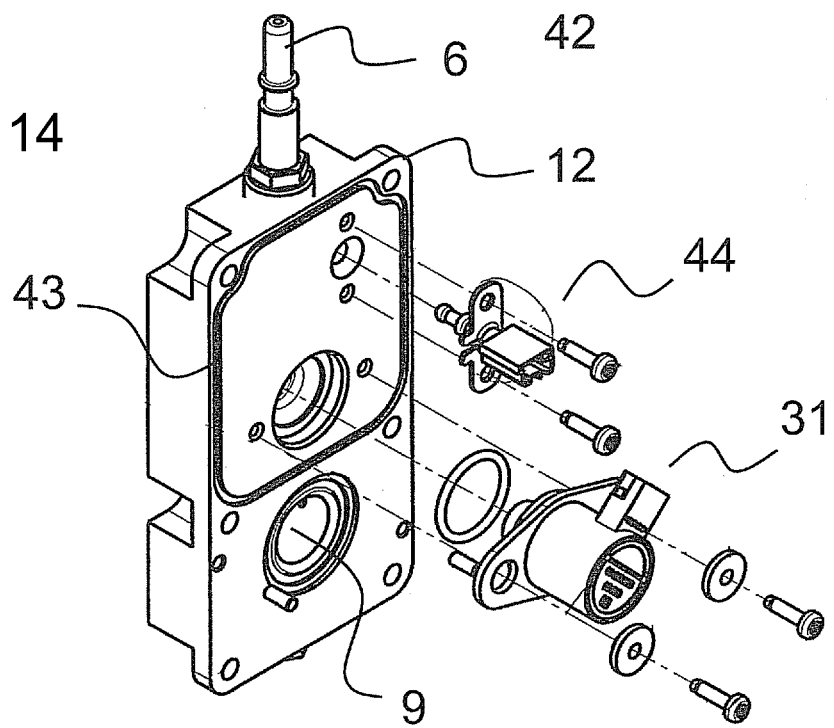
FIG. 14 is a second enlarged, exploded, perspective view of FIG. 11.

It is possible to see from FIG. 14 how a temperature sensor 44 and the pressure sensor 31 are attached to the flange 12. The O-ring seal 43 is additionally provided on the flange 12, surrounds the temperature sensor 44 and the pressure sensor 31, and can be used to form a splash-proof seal between the flange 12 and a cover (which is not shown therein). This cover may be formed by a pump head (which is not shown). A pump chamber 9 can also be seen in FIG. 14. The pump chamber 9 is a constituent of the flange 12. A pump diaphragm 13 can be placed over the pump chamber 9. This pump diaphragm 13 can be moved by the drive unit 10 (which is also not shown therein but is shown in FIG. 2) in order to convey reducing agent. The drive unit 10 is preferably disposed in the pump head (which is not shown).

Figure 15:
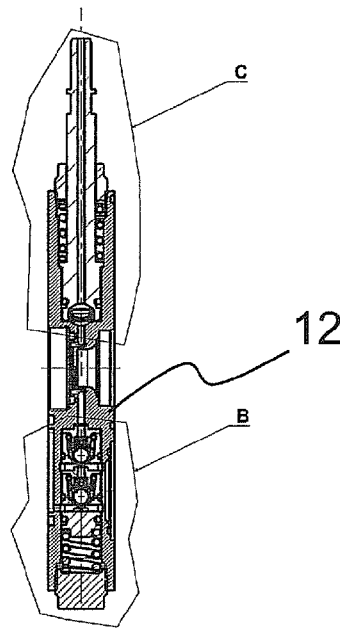
FIG. 15 is a longitudinal-sectional view of a flange of a conveying unit according to the invention.

FIG. 15 is a further sectional view through a conveying unit 1 according to the invention with a flange 12. Details of the illustration in FIG. 15 are shown in FIGS. 16 and 17.

Figure 16:
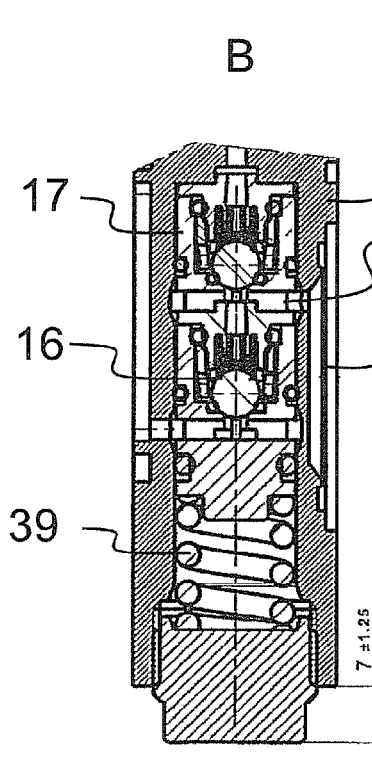
FIG. 16 is an enlarged, fragmentary, sectional view of a portion B of FIG. 15.

FIG. 16 shows the inlet valve 16 and the outlet valve 17 of the pump 8 of the conveying unit 1 which are inserted into the flange 12 through a passage. The inlet valve 16 and the outlet valve 17 are biased in the passage by a resilient element constructed as a spring. The inlet valve 16 and the outlet valve 17 are thus movable when the pressure in the conveying unit 1 exceeds a threshold pressure. A biased ice pressure compensation element 39 is thus formed. The inlet valve 16 and the outlet valve 17 communicate with the pump chamber 9 through the spur duct 15.

Figure 17:
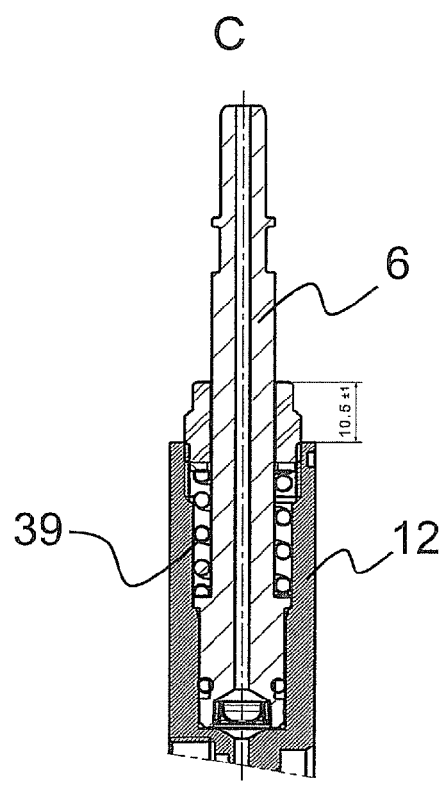
FIG. 17 is an enlarged, fragmentary, sectional view of a portion C of FIG. 15.

FIG. 17 illustrates the outlet fitting 6, which is also fixed by a spring-loaded element constructed as a spring in a passage in the flange 12. The outlet fitting 6 is thus also movable when the pressure in the conveying unit 1 exceeds a threshold pressure. A biased ice pressure compensation element 39 is thus also formed on the outlet fitting 6.

Figures 18, 19:
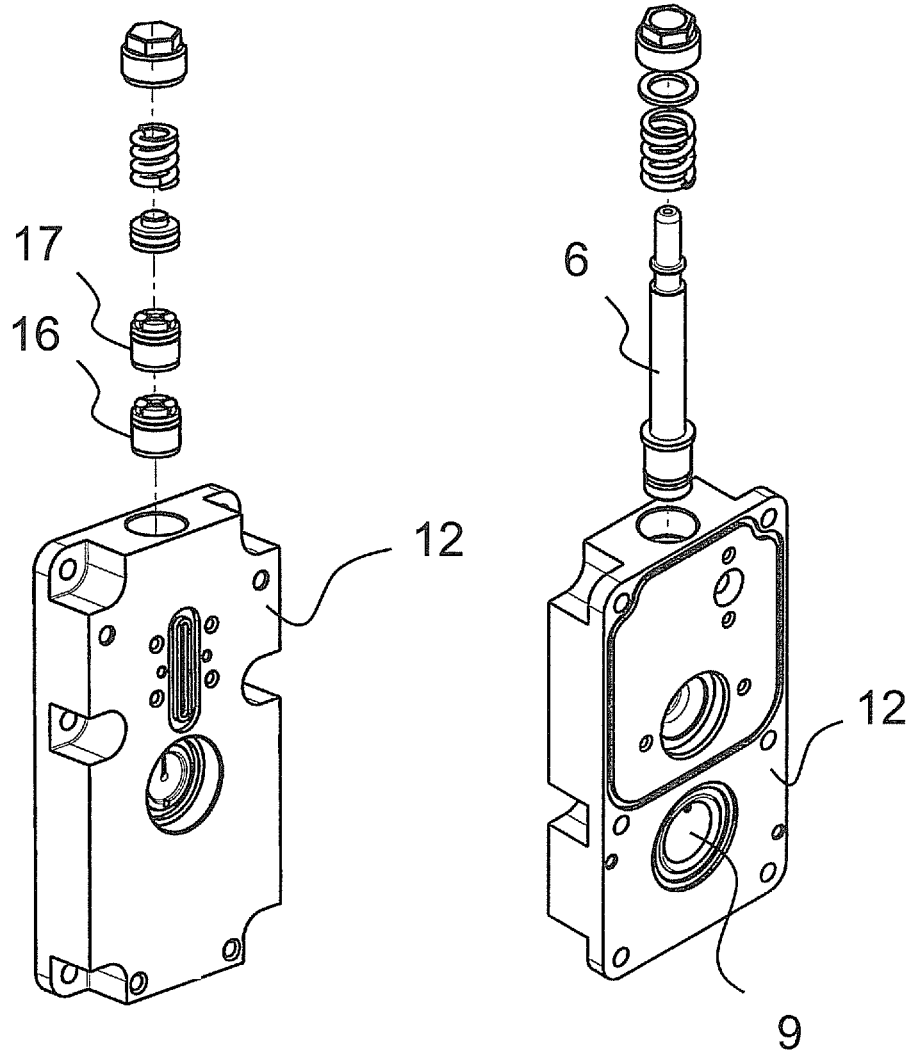
FIG. 18 is a first enlarged, exploded, perspective view of FIG. 15.
FIG. 19 is a second enlarged, exploded, perspective view of FIG. 15.

FIGS. 18 and 19 are respective exploded views, showing how the inlet valve 16 and the outlet valve 17 or the outlet fitting 6 are inserted into the flange 8. The pump chamber 9 formed on the flange 12 can also be seen.

The invention claimed is:

1. A conveying unit for conveying reducing agent from a tank to an exhaust gas treatment device for treating exhaust gases from an internal combustion engine, the conveying unit comprising:
   a pump having a drive and a pump chamber containment;
   said drive and said pump chamber containment being detachably interconnected;
   said pump chamber containment at least partly delimiting a pump chamber; and
   a controller configured to operate said pump for a test run with minimal driving power to determine if frozen reducing agent present in the conveying unit is impeding operation of said pump.

2. The conveying unit according to claim 1, which further comprises a flange, said drive being fastened to said flange, and said pump chamber containment being at least partly formed by said flange.

3. The conveying unit according to claim 1, which further comprises a pump diaphragm separating said pump chamber containment and said drive.

4. The conveying unit according to claim 3, wherein said pump chamber containment is constructed in the form of a half shell and said pump chamber is delimited by said pump chamber containment and by said pump diaphragm.

5. The conveying unit according to claim 1, wherein said pump chamber has a chamber volume configured to be reduced during a pumping procedure to a dead volume, and said dead volume is less than 20% of said chamber volume.

* * * * *